United States Patent [19]

Barlow et al.

[11] 3,803,552

[45] Apr. 9, 1974

[54] ERROR DETECTION AND CORRECTION APPARATUS FOR USE IN A MAGNETIC TAPE SYSTEM

[75] Inventors: George J. Barlow, Tewksbury; John A. Klashka, Andover, both of Mass.

[73] Assignee: Honeywell Information Systems, Inc., Waltham, Mass.

[22] Filed: May 9, 1973

[21] Appl. No.: 358,770

[52] U.S. Cl. .................... 340/146.1 F, 340/174.1 B

[51] Int. Cl. ........................ G11b 27/36, G06k 5/04

[58] Field of Search ................ 340/146.1 F, 174.1 B

[56] References Cited

UNITED STATES PATENTS 3,509,531 4/1970 Wilkinson et al. ........... 340/146.1 F

*Primary Examiner*—Felix D. Gruber

*Assistant Examiner*—R. Stephen Dildine, Jr.

*Attorney, Agent, or Firm*—Faith F. Driscoll; Ronald T. Reiling

[57] ABSTRACT

A deskewing buffer system includes a plurality of storage registers, each of which include a plurality of storage devices. Pairs of storage devices of each register provide storage for a single information channel. The devices of each channel include circuits for detecting when the information bits of a channel are arriving too early with respect to the other channels indicative of a marginal condition in advance of a failure. When the circuits detect such a condition they operate to switch a storage device to a predetermined state indicating a channel failure. Thereafter, the storage devices of a predetermined one of the pairs of the channel are switched to the same predetermined state during succeeding bit intervals signaling for a correction to be made by other error circuits of the system which normally process transit errors. These circuits couple to a last storage register of the buffer system and are operative to check the deskewed contents of the register and generate a signal indicating the type of correction required. The signal causes the contents of one of the buffer pairs of storage devices of the channel to be stored in an output register. Additionally, the system includes circuits for reliably signaling a channel failure upon the detection of a predetermined number of consecutive transit errors.

30 Claims, 9 Drawing Figures

Fig. 1.

ERROR DETECTION AND CORRECTION APPARATUS FOR USE IN A MAGNETIC TAPE SYSTEM

RELATED APPLICATIONS

1. "A Deskewing Buffer Arrangement which includes Means for Detecting and Correcting Channel Errors," Ser. No. 321,094 filed on Jan. 4, 1973 invented by David D. DeVoy, George J. Barlow and John A. Klashka and assigned to the assignee named herein.

2. "Noise Record Processing for Phase Encoded Data," Ser. No. 320,229 filed on Jan. 2, 1973, invented by David D. DeVoy, George J. Barlow and John A. Klashka and assigned to the same assignee named herein.

BACKGROUND OF THE INVENTION

1. Field of Use

This invention relates to checking circuits and more particularly to error detection and error correction circuits associated with the deskewing buffer apparatus of a magnetic tape system.

2. Prior Art

It is well known to provide deskewing apparatus for receiving the bits of a character from a number of channels, assembling them as a character in an output register and transferring them to an utilization device. In high density recording systems such as those which use phase encoding techniques, it is also known to process the bit signals from each channel or track independently to facilitate the recovery of the recorded information. Therefore, separate timing or clocking circuits have been included as part of the deskewing apparatus for each channel.

In such high density systems, it has been found that during the recovery process as a result of certain disparities in timing between the different timing or clocking circuits of different channels can result in an "overskew" condition. That is, the data bits of a channel can arrive sufficiently earlier in time as contrasted the arrival bit rates of the remaining channels so as to have insufficient storage for that channel. Actually, there need only be a sufficient disparity in rates between two channels since it is the bits of a channel to arrive last within the remaining channels which determine when all the bits of a given character have been assembled. Of course, this will vary from character to character under normal operating conditions.

However, when the clocking or timing circuits begin to operate marginally, this can produce the "overskew" condition. One prior art deskewing apparatus has included means for detecting "an overskew error condition" occurring within one or more channels by utilizing signals which transfer the bits of a character through the register stages of the deskewing apparatus. However, the arrangement while suitable for asynchronous transfer operations, it appears unsuitable for high density systems utilizing separate clocking circuits. The important reason is that the system requires that transfer signals used to transfer the bits from each channel be derived from a common timing source. More importantly, the prior art arrangement can in no way correct for an "overskew" error condition. Furthermore, the arrangement cannot indicate which one or ones of the channels is experiencing the "overskew" condition.

Another prior art system provides apparatus for monitoring phase error within each track or channel and for monitoring each byte or character for parity error. The concurrence of the two errors causes the setting of an indication of a "dead track" (bad information on a track or channel). While this system provides apparatus for signaling when a channel is "bad," the "dead track" condition can be indicated too early as a result of transient conditions such as noise. Once a channel has been "dead tracked," errors in other channels make correction impossible for the duration of that record. Moreover the prior art arrangement can only detect certain types of error conditions connected with the sensing operation in contrast to error conditions resulting from improper timing and transfer of data during the deskewing operation.

Accordingly, it is an object of the present invention to provide improved apparatus for monitoring the operation of apparatus associated with any one of a number of information channels to detect a degradation in operation.

It is a further object to provide apparatus for reliably detecting for the occurrence of an overskew condition occurring within the apparatus of any one of a plurality of channels included within the deskewing apparatus of a magnetic tape system.

It is another object of the present invention to provide apparatus for automatically correcting for an overskew condition detected within any one of a number of channels.

It is a more specific object of the present invention to provide for automatic detection and correction of information from any one of a number of information channels.

SUMMARY OF THE INVENTION

The above objects are achieved in a preferred embodiment of the present invention which includes monitoring apparatus which operates in connection with detection and correction apparatus included as part of the deskewing apparatus of a magnetic tape system.

In the preferred embodiment, the deskewing apparatus includes a plurality of pairs of storage devices for each channel. Additionally, each channel includes circuits for detecting when a channel has experienced one type of error condition which causes a predetermined coding of data bits to be transferred through the channel storage. This error condition is a "dropped bit" condition and the apparatus for handling such occurrences is described in the previously referenced copending patent application titled "A Deskewing Buffer Arrangement Which Includes Means for Detecting and Correcting Channel Errors."

In accordance with the invention, the detection apparatus includes means which couples to the storage devices of a channel for detecting the occurrence of an overskew condition within the channel. Upon occurrence of the condition, the means set an indicator signaling that the channel is "dead" for all practical purposes. The indicator causes a predetermined code to be forced into the storage devices of the channel which is detected by the deskewing detection and correction apparatus. This allows the same apparatus which corrects for the occurrence of a "dropped bit" to correct in the same manner the information from a "bad channel."

Additionally, in accordance with the present invention, the same channel indicator is used to signal a "dead channel" when a predetermined number of consecutive dropped bits have occurred within that channel. The number chosen corresponds to an interval of time that the channel clocking circuits can operate without receiving input pulses and still maintain synchronization with the incoming data stream. The number chosen enables the clocking circuits to be built economically and still operate reliably.

Thus, the apparatus of the invention only signals a "dead" channel when the condition endures for a time sufficient to indicate that a failure in the channel is imminent. An indication of the error condition is stored and can be examined by diagnostic hardware following the termination of the read operation. Although the error condition is correctable, its storage is helpful to signal the existance of degrading but not yet failing condition within the channel.

Also, the invention shares common apparatus for detecting and correcting a number of different error conditions, it has the advantage of both increasing reliability and minimizing cost.

The above and other objects of this invention are achieved in a preferred embodiment disclosed hereinafter. Novel features which are believed to be characteristic of the invention both as to its organization and method of operation, together with further objects and advantages will be better understood from the following description considered in connection with the accompanying drawings. It is to be expressly understood, that the drawings are for the purpose of illustration and description only and are not intended as a definition of the limits of the present invention.

DESCRIPTION OF THE PREFERRED EMBODIMENT

Figure 1:
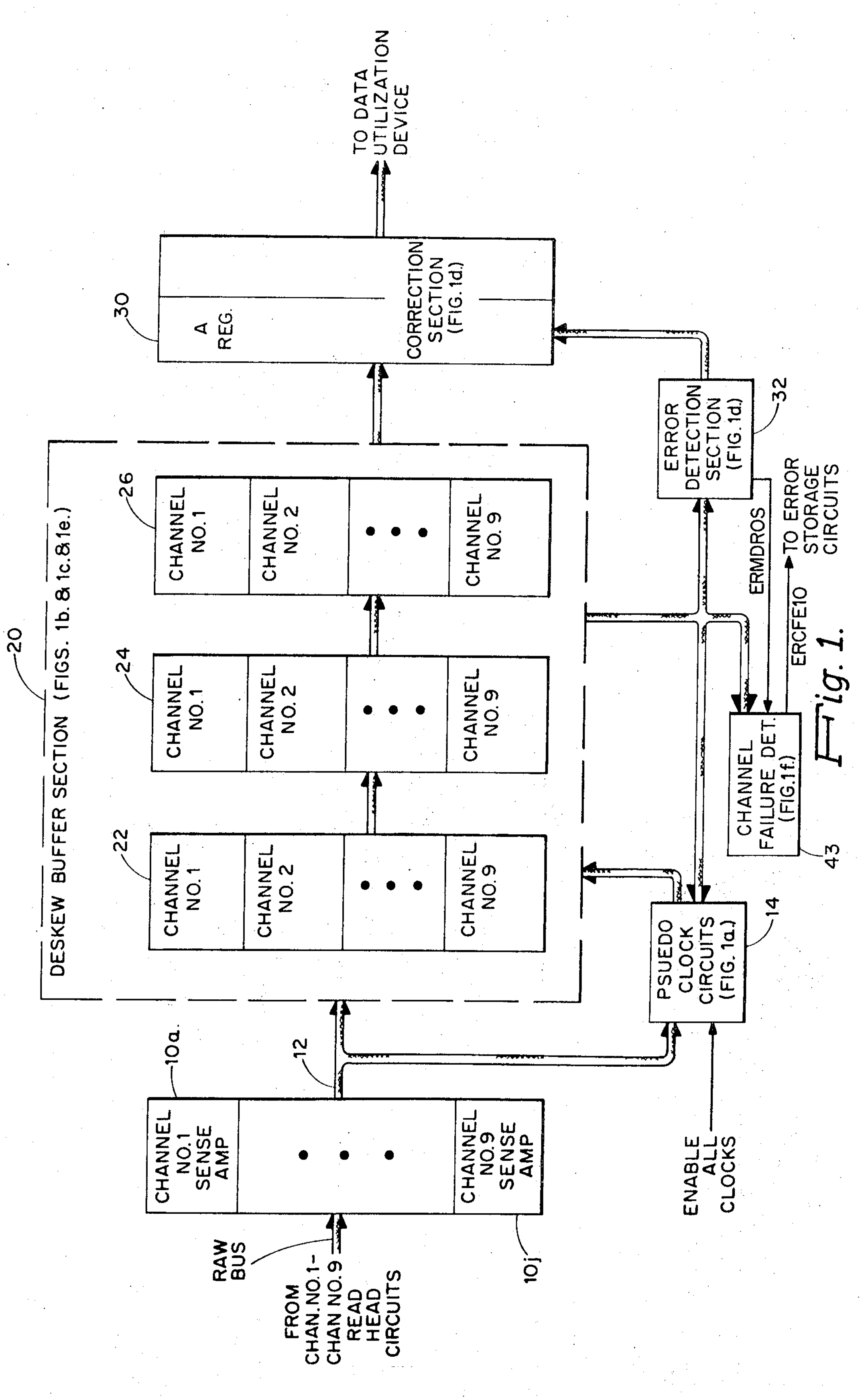
FIG. 1 shows in block diagram form a system which utilizes the detection and correction apparatus of the present invention.

Referring first to FIG. 1, there is shown a read section of a magnetic tape subsystem which incorporates the error detection and correction apparatus of the present invention. This system includes a plurality of channel amplifier circuits **10*a* through 10*j***, each of which are operative to receive phase encoded information signals from a corresponding number of read head circuits, not shown.

For the purpose of the present invention, the sense amplifier circuits **10*a* through 10*j*** may be considered conventional in design and function to provide pulses representative of binary ZEROS and binary ONES. In particular, the sense amplifier circuits sense positive and negative transitions of phase encoded signals wherein a positive going transition occurring in the middle of a bit cell represents a binary ONE and a negative going transition occurring in the middle of the bit cell represents binary ZERO. Additionally, the sense amplifier circuits sense transitions which occur between successive binary ONES and between successive binary ZEROS. Thus, each of the sense amplifier circuits convert the positive and negative transitions into pulses which are applied to a DATA ONE output terminal and a DATA ZERO output terminal respectively.

The sense amplifier circuits of each channel apply via a bus 12 the data ONE pulses and data ZERO pulses from their respective output terminals as separate inputs to a respective one of the pseudo clock circuits of block 14. Additionally, these pulses are applied to a pair of input storage devices of the channel which comprise a first register 22 of the deskew buffer section 20.

Figure 1A:
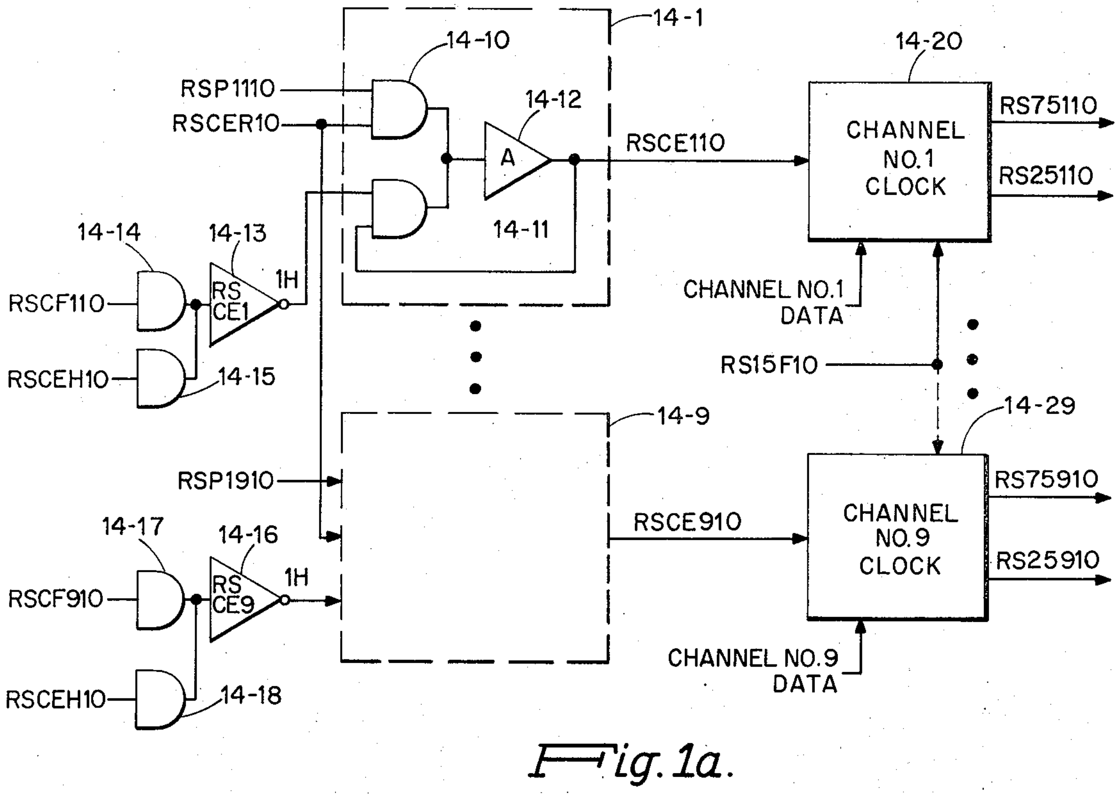
FIG. 1*a* shows in greater detail the pseudo clock circuits and associated circuits of FIG. 1.

The pseudo clock circuits 14 shown in blocks 14–20 through 14–29 in FIG. 1*a* can for the purposes of this invention be considered conventional in design. For example, each of the pseudo clock circuits may include a voltage control oscillator circuit whose frequency is adjusted in accordance with the input data bits received from the channel. Each pseudo clock circuit operates to provide a set of pulses which define the 25 percent point and 75 percent point of a bit cell interval. The signal RS25110 and the signal RS25910 respectively define the 25 percent points for channels 1 and 9 respectively. Similarly signal RS75110 and signal RS75910 respectively define the 75 percent points for channels 1 and 9.

As seen from FIG. 1*a*, each of the pseudo clock circuits are enabled by a corresponding one of the circuits 14–1 through 14–9. Enabling occurs initially when circuits, not shown, within the magnetic tape system signal the start of a valid data record. At this time, signal RSCEH10 is a binary ZERO until the termination of a data record. Noise detection circuits, not shown detect the presence of a valid data record which forces signal RSCER10 to a binary ONE state. This signal conditions an AND gate, as for example AND gate 14–10, which switches a corresponding one of the circuits 14–1 through 14–9 to a binary ONE upon receiving a "DATA ONE" pulse from a corresponding one of the sense amplifier circuits. The "DATA ONE" pulse signals for channel 1 to channel 9 are designed respectively as signals RSP1110 through RSP1910 in FIG. 1*a*.

Each of the circuits 14–1 through 14–9 are held in a binary ONE state via an AND gate, such as AND gate 14–1, until a corresponding one of the hold signals RSCE11H through RSCE91H is forced to a binary ZERO state. Normally, this occurs when a signal RSCEH10 applied via one of the input gates, such as gate 14–15, is forced to a binary ONE at the completion of a read operation. Additionally, as explained in greater detail herein, each of the circuits 14–1 through 14–9 are reset when a corresponding one of the signals RSCF110 through RSCF910 is forced to a binary ONE state. Resetting occurs in the case of channels 1 and 9 respectively via a gate 14–14 and inverter circuit 14–13 and a gate 14–17 and inverter circuit 14–16. When resetting occurs, the pseudo clock circuits are prevented from producing further clocking signals.

A signal RS15F10 when in a binary ZERO state inhibits each of the pseudo clock circuits 14–20 through 14–29 from responding to pulses applied from its DATA ONE output terminal when the clock circuits are in the process of being synchronized during an initial portion of a read operation. The reason is that during the initial phase, the sense amplifier circuits only reads signals representative of all zero characters included in a preamble portion of a data record. Thus, pulses at the DATA ONE terminals are phase signals rather than data signals. For proper synchronization, only the DATA ZERO terminal pulses are applied to the clock circuits during the synchronization phase. After approximately one-half of the preamble portion of the data record has been read, signal RS15F10 switches to a binary ONE which in turn allows pseudo clock circuits to respond to both sets of pulses.

Deskew Buffer Section 20

Figure 1F:
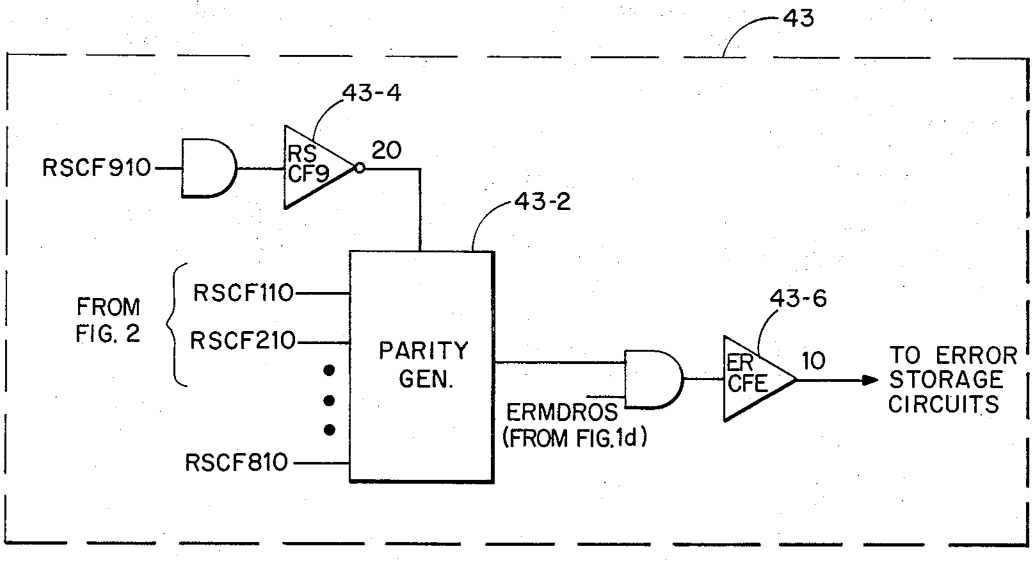
FIG. 1*f* shows in greater detail the channel error detection circuits of FIG. 1.
Figure 1B:
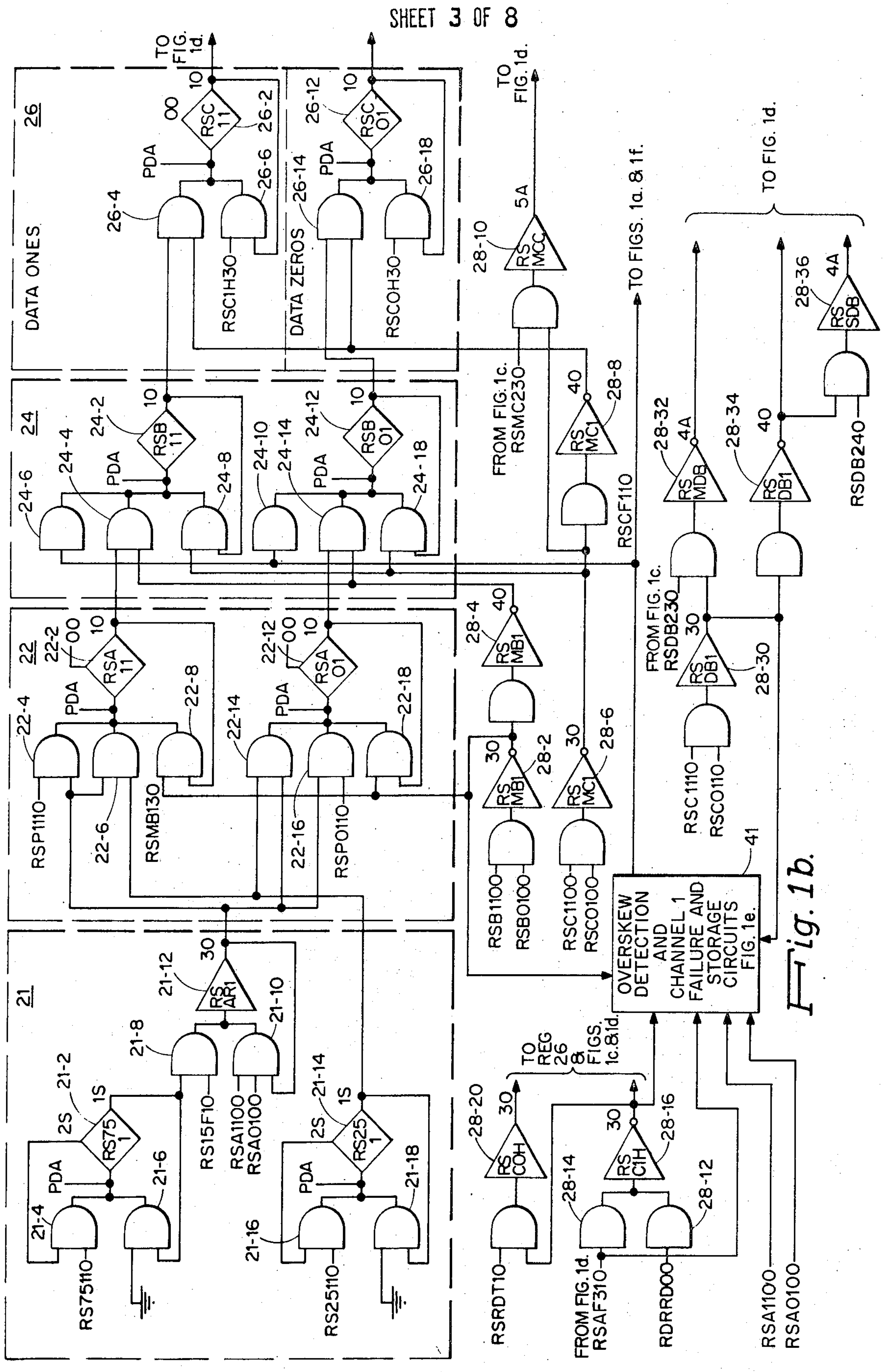
FIG. 1*b* shows in greater detail the storage and associated circuits included in a first information channel of the deskew buffer section of FIG. 1.
Figure 1C:
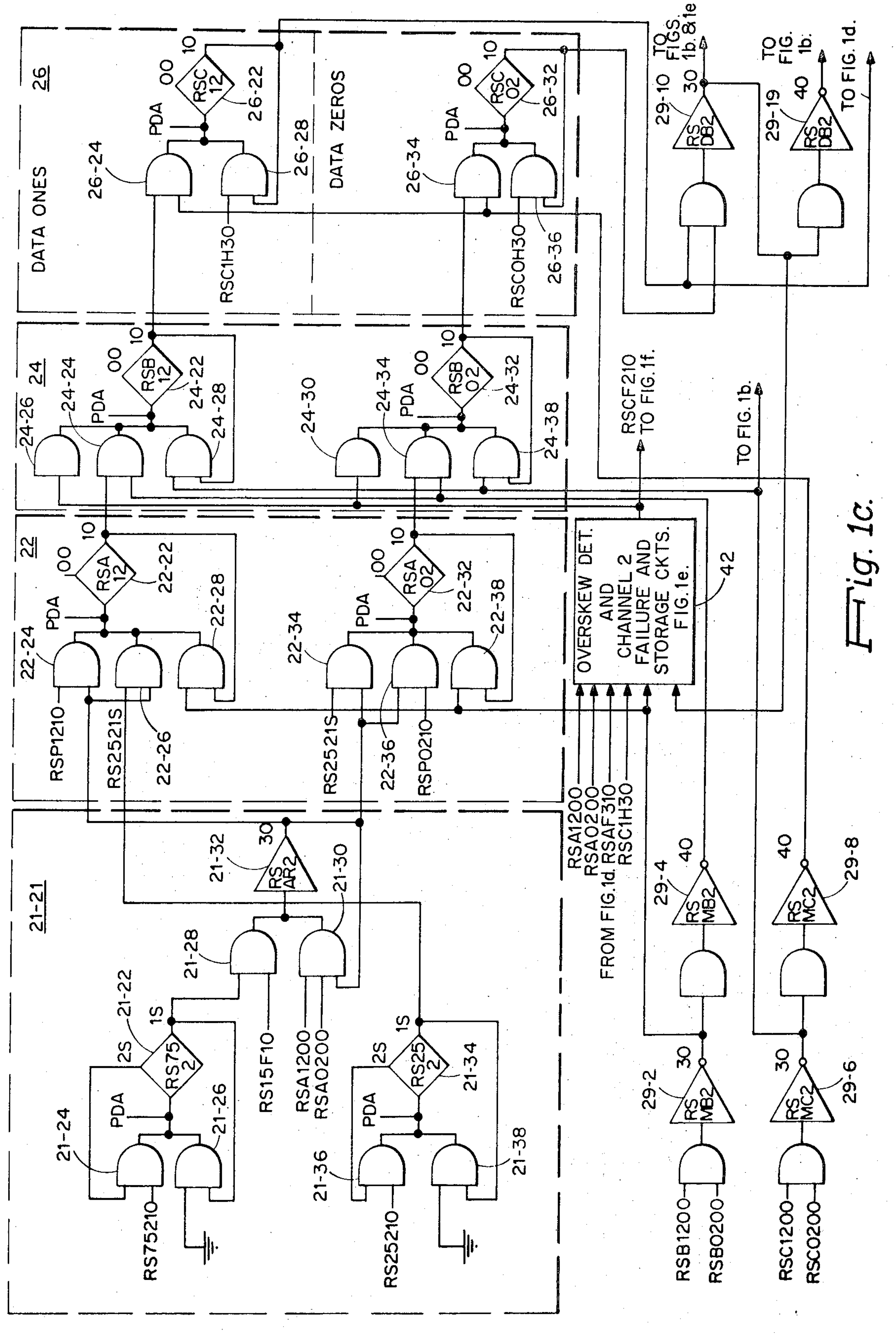
FIG. 1*c* shows in greater detail the storage and associated circuits of a second information channel of the deskew buffer section of FIG. 1.

Referring first to FIGS. 1*b* and 1*c*, it is seen that the clocking signals generated by corresponding ones of the pseudo clock circuits are applied to a pair of flip-flops included in blocks 21 and 21–21 of their respective buffer channel circuits. Briefly, the clocking signals from pseudo clock circuits of channel 1 and 2 are applied to flip-flops 21–2, 21–14 and to flip-flops 21–22 and 21–34 respectively.

Clocking signals are RS75110 and RS75210 respectively switch flip-flops 21–2 and 21–22 to the binary ONE states in response to a further PDA clocking signal generated by a system clock, not shown. The switching is accomplished via AND gates 21–4 and 21–24. The flip-flops are reset to their binary ONE states via AND gates 21–6 and 21–26 in response to PDA clocking signals.

Similarly, flip-flop 21–14 and flip-flop 21–34 switch to the binary ONE states in response to clocking signals RS25110 and RS25210 applied by a corresponding one of the gates 21–16 and 21–36. Resetting of these flip-flops occurs via AND gates 21–18 and 21–38. These input flip-flops are operative to convert the asynchronously arriving 25 percent and 75 percent clock pulses obtained from the magnetic medium into clocking signals synchronized with the system clock.

When signal RS15F10 is forced to a binary ONE, the pair of AND gates 21–8 and 21–28 are operative to apply signals RS7511S and RS7521S to the input pairs of storage devices of register 22 as shown in FIGS. 1*b* and 1*c*. That is, latching circuits included within blocks 21 and 21–21 are operative in response to 75 percent pulse signals to switch to binary ONES in turn enabling a pair of input AND gates (i.e., AND gates 22–4 and 22–16 — Channel 1 and AND gates 22–24 and 22–34 — Channel 2) to switch to binary ONES in response to corresponding ones of the signals RSP1110, RSP0110, RSP1210 and RSP0210.

As explained in the aforementioned patent application titled "A Deskewing Buffer Arrangement Which Includes Means for Detecting and Correcting Channel Errors," the input pair of storage devices, such as flip-flops 22–2 and 22–12, are forced to the same binary ONE states when the latch circuit associated therewith has detected the occurrence of a "drop bit" within the channel. First, when neither flip-flop 22–2 nor 22–12 has switched to a binary ONE state, the occurrence of a 25 percent pulse causes an AND gate 22–6 and an AND gate 22–14 to be switched to their binary ONE states which in turn switch both input flip-flops to their binary ONE states. Similarly, flip-flops 22–22 and 22–32 are switched to their binary ONE states via corresponding ones of the AND gates 22–26 and 22–34 as seen from FIG. 1*c*.

The input flip-flops which comprise register 22 are reset to their binary ZERO states when the corresponding pairs of flip-flops of a next buffer register (i.e., register 24) have been emptied or have been cleared. More specifically, when the flip-flops 24–2 and 24–12 of channel 1 are both binary ZEROS, this causes an AND gate and inverter circuit 22–8 to switch signal RSMB130 to a binary ZERO which resets the flip-flops via AND gates 22–8 and 22–18. At the same time, signal RSMB130 causes a further gate and inverter circuit 28–4 to switch a signal RSMB140 to a binary ONE. This signal conditions AND gates 22–4 and 24–14 to enable the corresponding flip-flops 24–2 and 24–12 for storing information contained within the channel 1 flip-flops 22–2 and 22–12.

A channel 2 flip-flops 22–22 and 22–32 are reset to their binary ZERO states in response to a signal RSMB230 generated by an AND gate and inverter circuit 29–2 under similar conditions as those described in connection with channel 1. At the same time, a signal RSMB240 is generated by a gate and inverter circuit 29–4 which enables the flip-flops 24–22 and 24–32 for storing information contained in channel 2 flip-flops of register 22.

A similar transfer of information occurs between the channel storage flip-flops of registers 24 and 26 when the channel flip-flops of register 26 are emptied or cleared to their binary ZERO states. Briefly, an AND gate and inverter circuit 28–6 forces a signal RSMC130 to a binary ZERO state when the flip-flops of the previous stage are both binary ZEROS. This signal resets flip-flops 24–2 and 24–12 to their binary ZERO states via AND gates 24–8 and 24–18 respectively. A further gate and inverter circuit 28–8 in turn forces a signal RSMC140 to a binary ONE which enables flip-flops 26–2 and 26–12 to store the contents of flip-flops 24–2 and 24–12. As seen from FIG. 1*c*, channel 2 flip-flops 24–22 and 24–32 are reset to their binary ZERO states by an AND gate and inverter circuit 29–6 which forces a signal RSMC230 to a binary ZERO. At the same time, a further gate and inverter circuit 29–8 forces a signal RSMC240 to a binary ONE which enables flip-flops 26–22 and 26–32 to store information stored in flip-flops 24–22 and 24–32.

It will be appreciated that in the instance of each of the above mentioned transfer of information between registers 22, 24 and 26, the information is loaded into the various registers in response to PDA clocking signals. In the absence of transfers of information taking place between the storage devices of register 26 and register 30 of FIG. 1, a pair of hold signals RSC1H30 and RSCOH30 are binary ONES. These signals maintain their corresponding flip-flops in their binary ONE states. As seen from FIGS. 1*b* and 1*c*, AND gates 26–6

26–26 and AND gates 26–16, 26–36 perform the required holding functions for channel 1 and channel 2 flip-flops.

Figure 1D:
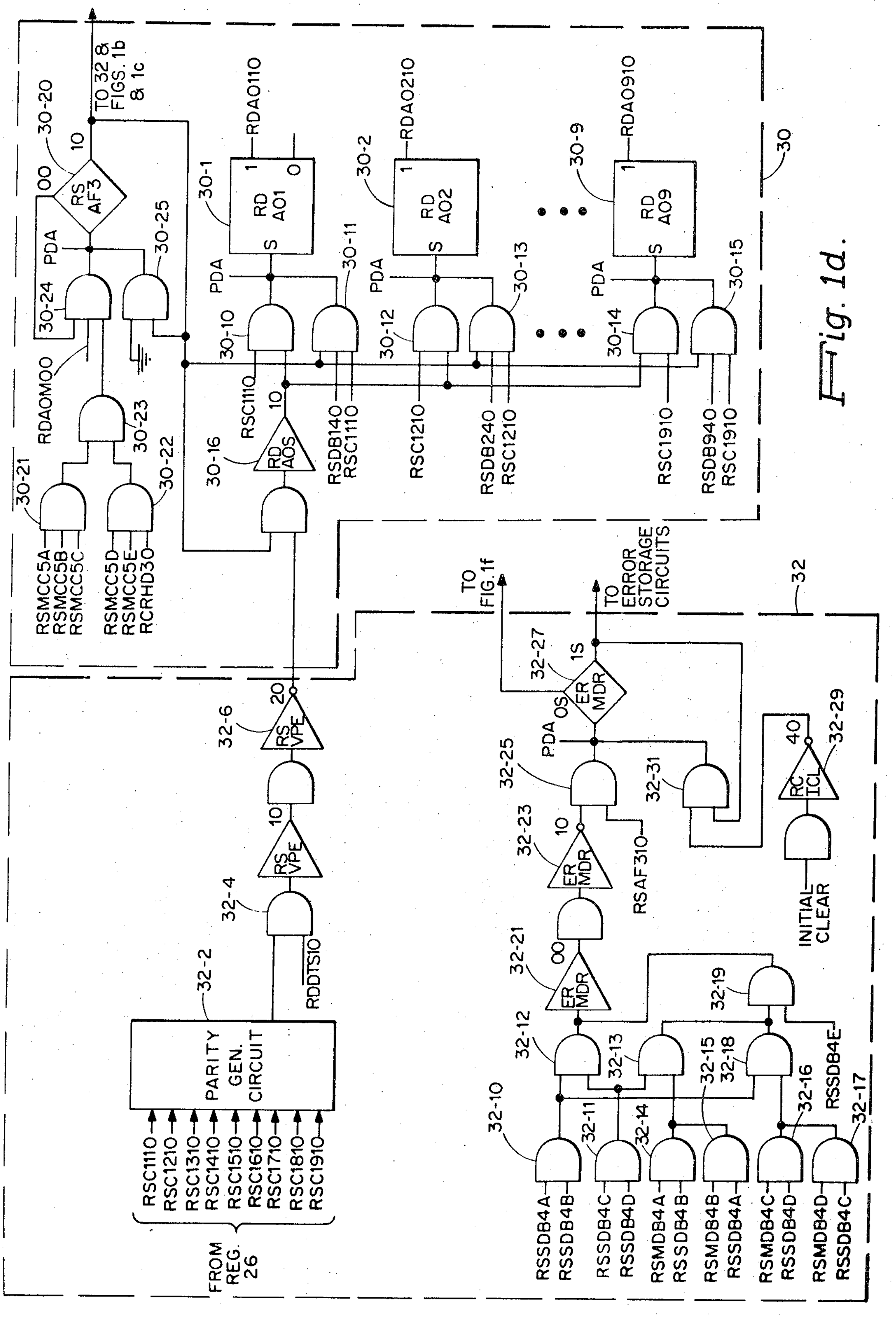
FIG. 1*d* shows in greater detail the circuits of the error correction and detection section of FIG. 1.

As seen from FIG. 1*b*, the signals from a pair of gates 28–12 and 28–14 together with the signals from an inverter circuit 28–16 and an AND gate and amplifier circuit 28–20 are combined to generate the aforementioned hold signals RSC1H30 and RSC0H30. Normally, during a read operation, a signal RDRRD00 and a signal RSRDT10 are in a binary ZERO and in a binary ONE state respectively. A complete character assembled signal RSAF310 generated by circuits disclosed in FIG. 1*d* is normally a binary ZERO except when register 30 is being loaded with information stored in register 26. This signal is generated in the manner described in greater detail herein.

In addition to the above described circuits, FIGS. 1*b* and 1*c* also include circuits for signaling the remaining circuits of FIG. 1 when both channel 1 and channel 2 storage devices have received information and when either channel has dropped a bit of information. Since the circuits are described fully with respect to the aforementioned patent application of David D. DeVoy et al., these circuits will only be described briefly herein. An AND gate and amplifier circuit 28–10 forces signal RSMCC5A to a binary ONE when both signals RSMC130 and RSMC230 are binary ONES. Signals RSMC130 and RSMC230 are binary ONES when either one of the storage flip-flops of register 26 for that channel has been switched to a binary ONE. Thus, the state of signal RSMCC5A forwarded to the circuits of FIG. 1*d* signal when both channel 1 and channel 2 store information.

An AND gate 28–30 and inverter circuit 28–32 together with gate and inverter circuits 28–34 and 28–36 generate signals indicating when either channel 1 or channel 2 has dropped a bit of information. That is, AND gate and amplifier circuit 28–30 forces signal RSDB130 to a binary ONE when both flip-flops 26–2 and 26–12 store binary ONES signaling the occurrence of a dropped bit within that channel. Similarly, an AND gate 29–10 of FIG. 1*c* forces signal RSDB230 to a binary ONE when both flip-flops 26–22 and 26–32 are binary ONES signaling the occurrence of a dropped bit within channel 2. The AND gate and inverter circuit 28–32 forces signal RSMDB4A to a binary ZERO when both channel 1 and channel 2 have each dropped a bit of information. Accordingly, signal RSMDB4A is a binary ONE when only one channel has dropped a bit of information. The gate and inverter circuit 28–34 forces signal RSDB140 to a binary ZERO when channel 1 has not dropped a bit of information. The AND gate and amplifier circuit 28–36 forces signal RSSDB4A to a binary ONE when neither channel 1 nor channel 2 has dropped a bit of information. These signals are forwarded to detection circuits and register 30 of FIG. 1*d* and are used to correct for a "dropped bit" within channel 1.

Figure 1E:
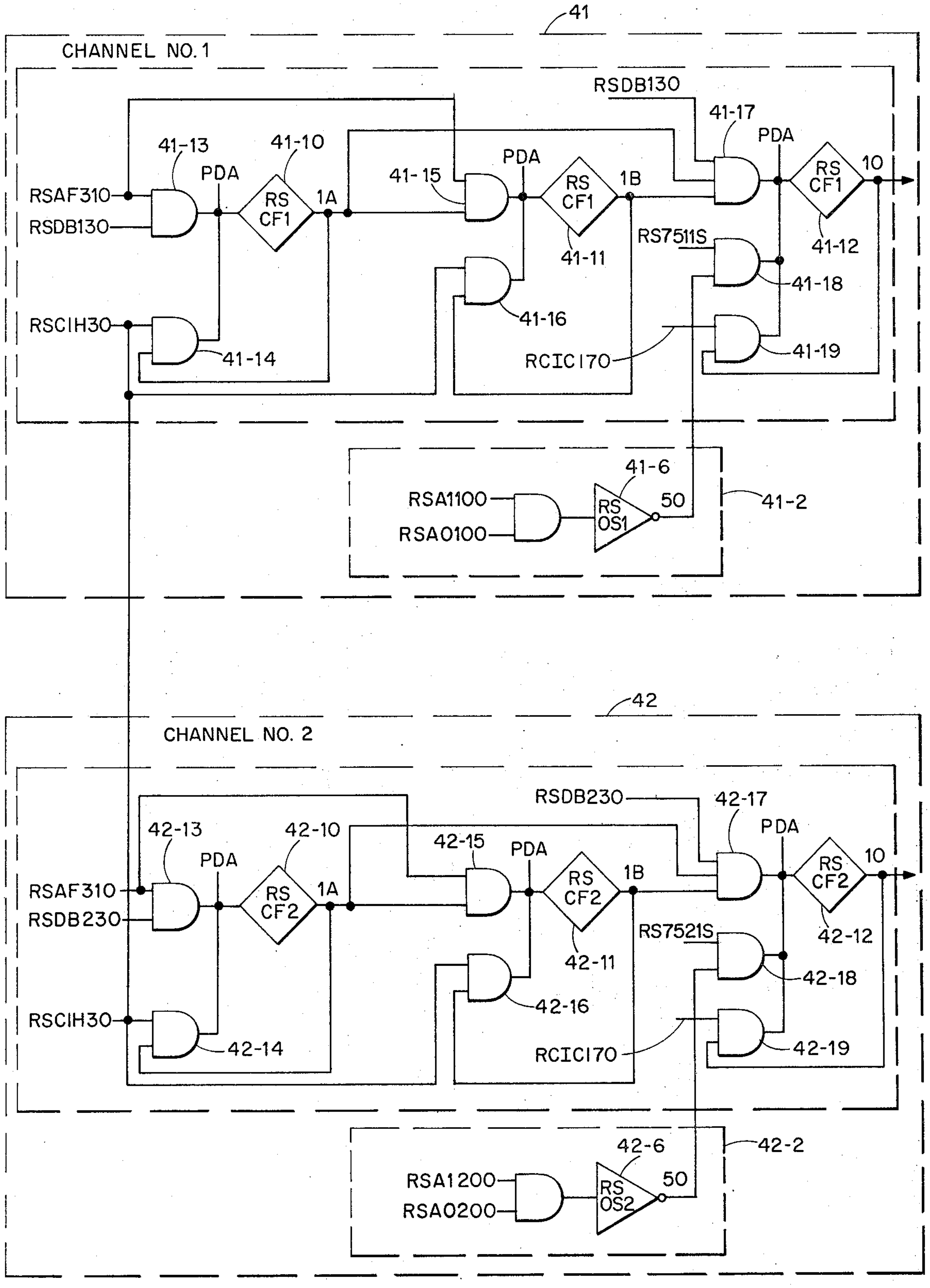
FIG. 1*e* shows in greater detail the overskew detection and channel error circuits of the present invention included within FIGS. 1*b* and 1*c*.

Overskew Detection and Channel Failure Storage Circuits — FIG. 1*e*

In accordance with the present invention, additional detection circuits are included within each channel for detecting the occurrence of an "overskew" condition and for detecting when a channel has "dropped" a predetermined number of consecutive bits. As seen from FIGS. 1*b* and 1*c*, the detection circuits are included within blocks 41 and 42 of the Figures. The circuits for each channel are shown in greater detail in FIG. 1*e*. Referring to that Figure, it is seen that detection circuits 41–2 and 42–2, each include a gate and inverter circuit. The gate and inverter circuit of each channel (e.g., circuits 41–6 and 42–6) forces its output terminal to a binary ONE when the storage flip-flops of register 22 store information. That is, signal RSOS150 is a binary ONE when either one of the flip-flops 22–2 or 22–12 of FIG. 1*b* stores a binary ONE. That is, in the event that the information contained within the flip-flops 22–2 and 22–12 has not been stored in register 24, this means that the succeeding flip-flops have not been cleared. When these flip-flops have not been cleared to their binary ZERO states via signals RSC1H30 and RSCOH30 before the start of a next bit interval, indicated by pulse signal RS7511S being forced to a binary ONE, the gate and inverter circuit of the detection circuits forces its output terminal to a binary ONE state signaling the occurrence of an overskew condition within the channel.

As seen from FIG. 1*e*, the gate and inverter circuit 42–6 is arranged similar to the circuit of channel 1 and operates in a similar manner to force signal RSOS250 to a binary ONE upon detecting an overskew condition within channel 2.

The overskew detection circuits 41–2 and 42–2, each share a channel failure indicator flip-flop used for signaling another condition which is indicative of a potential hardware failure within the channel. More specifically, each channel also includes three series connected synchronous flip-flops which function to count on a per channel basis, consecutive "dropped bit" occurrences within the channel. For channel 1, the flip-flops 41–10 through 41–12 together with associated AND gate circuits 41–13 through 41–17 arranged as shown operate to count the number of consecutive "dropped bits" which have occurred during the processing of successive characters or bytes of information. That is, the first flip-flop 41–10 switches to its binary ONE state when the bits of a full byte or character have been assembled in register 26 (i.e., signal RSAF310 is a binary ONE) and the detection circuits signal via AND gate 28–30 the occurrence of a drop bit within channel 1 (i.e., signal RSDB130 is a binary ONE). Flip-flop 41–10 is held in its binary ONE state by AND gate 41–14 as long as signal RSC1H30 remains a binary ONE. As seen from FIG. 1*b*, this signal remains a binary ONE until signal RSAF310 is forced to a binary ONE by gate 28–14 since signal RDRRD00 is normally a binary ZERO. The flip-flop 41–11 switches to its binary ONE state upon signal RSAF310 being again forced to a binary ONE provided flip-flop 41–10 is in a binary ONE state. This flip-flop remains in a binary ONE state as long as signal RSC1H30 is a binary ONE. The flip-flop 41–12 switches to a binary ONE state upon the occurrence of a third dropped bit within the channel defined by the binary ONE state of both flip-flops 41–10 and 41–11. Both flip-flops remain binary ONES so long as signal RSC1H30 is a binary ONE and this signal is a binary ONE during the interval between consecutively assembled characters. This guarantees that the dropped bit occurrences being detected are consecutive. Having been switched to a binary ONE state, flip-flop 41–12 remains in a binary ONE state until a clear signal RCICL40 is forced to a binary ZERO. This occurs at the beginning of each read operation or stated differently, this happens upon the completion of the read operation.

In the case of either the occurrence of several consecutive drop bits within the channel or the occurrence of an overskew condition, the channel failure flip-flop 41–12 switches to a binary ONE state signaling that the channel is "bad." It will be noted from FIG. 1*b* that the binary ONE output terminal of flip-flop 41–12 is applied as another input to the storage flip-flops of register 24 via a pair of gates 24–6 and 24–10. This allows both flip-flops to be switched to their binary ONE states enabling automatic detection and correction of the information from the channel as described herein.

Additionally, the binary ONE terminal of flip-flop 41–12 is applied as an input to the channel 1 pseudo clock circuits. More specifically, referring to FIG. 1*a*, it is seen that signal RSCF110 is applied via gate 14–14 to inverter circuit 14–13. When signal RSCF110 is forced to a binary ONE, it in turn forces signal RSCE11H to binary ZERO which resets latching circuit 14–1. As mentioned, this forces the clock enabled signal of RSCE110 to a binary ZERO which inhibits the pseudo clock 14–20 from producing further clocking signals.

In a fashion similar to that described with respect to channel 1, the channel 2 flip-flops 41–10 through 42–12 in FIG. 1*e* are operative to count consecutive "dropped bit" occurrences within channel 2 and force flip-flop 41–12 to a binary ONE state upon the occurrence of "dropped bit" within that channel. Each of the flip-flops 4 42–10 and 42–12 receive signal RSDB230 from AND gate and amplifier 29–10 of FIG. 1*c*. Additionally, flip-flops 42–10 and 42–11 receive signal RSAF310 and are arranged to be reset to their binary ZERO states when signal RSC1H30 is forced to a binary ZERO. As mentioned, this occurs when the bits of a complete character have been assembled in register 26 as detected by circuits of FIG. 1*d* as described herein.

The Detection and Correction Sections — FIG. 1*d*

These sections are the same as those disclosed in the aforementioned patent application to David D. DeVoy et al. As described therein, the section 32 detects whether a binary ONE or a binary ZERO bit has been dropped from one of the nine channels. The section includes a parity generation circuit 32–2 which receives the bit signals of a character or byte stored in the DATA ONE storage flip-flop of each pair of channel flip-flops which comprise register 26.

The circuit 32–2 generates an odd parity bit signal for the byte signals in a conventional manner and compares the generated parity signal with the channel 9 DATA ONE output signal RSC1910 and forces an AND gate and amplifier circuit 32–4 to a binary ZERO state when a binary ONE bit has been dropped from one of the channels. Conversely, the circuit 32–2 forces circuit 32–4 to a binary ONE state when a binary ZERO bit has been dropped from one of the channels.

A gate and inverter circuit 32–6 inverts the character or vertical parity error signal generated by circuit 32–2 and applies it as an input to register 30 as shown. The state of parity error signal RSVPE20 which indicates whether binary ONE or binary ZERO bit has been dropped from the channel is used to make the appropriate correction as the information from register 26 is being loaded into register 30.

Section 32 further includes a plurality of AND circuits 32–10 through 32–19 arranged as shown. These circuits receive the "dropped bit" signals generated by each of the channel circuits and cause an amplifier circuit 32–21 to force signal ERMDR00 to a binary ONE indicating that only a single bit has been dropped from a byte or character. That is, AND gate 32–10 generates a binary ONE output signal when there has been no drop bit occurrences in channels 1 through 4. Similarly, AND gate 32–11 generates a binary ONE signal when there have been no dropped bit occurrences in channels 5 through 8. The output signal from these gates are combined within AND gate 32–12 and force signal ERMDR00 to a binary ONE when there have been no drop bit occurrences in channels 1 through 8. The other AND gates such as AND gates 32–14 and 32–15 generate binary ONE signals when one of the channels has detected a dropped bit error. The AND gates 32–13 and 32–18 generate binary ONE output signals when there have been dropped bit errors in one of the first four or last four channels.

When there has been more than one dropped bit error, the result is that amplifier circuit 32–21 forces signal ERMDR00 to a binary ZERO which in turn causes a gate and inverter circuit 32–23 to force a multiple drop bit error signal ERMDR10 to a binary ONE. This signal is in turn applied to a multiple drop bit storage flip-flop 32–27 via an AND gate 32–25. When signal RSAF310 is forced to a binary ONE signaling that the bits from each of the channels have been assembled into a complete character or byte, the multiple dropped bit storage flip-flop 32–27 switches from its binary ZERO to its binary ONE state. The signals ERMDR1S and ERMDROS are forwarded to the circuits of FIG. 1*f* as well as to error storage circuits, not shown. A gate and inverter circuit 32–29 and an AND gate circuit 32–21 resets flip-flop 32–27 to its binary ZERO state in response to a clear signal which forces signal RCICL40 to a binary ZERO.

As seen from FIG. 1*d*, the A register circuits 30 include a plurality of flip-flops 30–1 through 30–9 which are operative to store the "deskewed character" assembled in register 26. This character or byte is then transferred from the A register to the remainder of the system for forwarding to the central processing unit or other utilization device.

In the preferred embodiment, the input AND gate circuits 30–10 through 30–15 couple to respective ones of the A register flip-flops and perform the actual error correction for dropped bit errors as well as other error conditions detected by the apparatus of the present invention. Each of these gating circuits are arranged to be responsive to control signals from the circuits of their respective channel signaling a dropped bit occurrence. The circuits in response to these control signals are operative to condition each of the A register flip-flops to load a correct version of the information from the DATA ONE flip-flop of each channel in accordance with the state of parity signal RSVPE20.

As seen from FIG. 1*d*, each flip-flop of register 30 has a first gate, such as gate circuit 30–10, which receives a signal RDAOS10 when signal RSVPE20 is a binary ONE. This signal is generated in response to signal RSAF310 from a flip-flop 30–20 when a complete character has been assembled in register 26 as indicated by at least one of each of the pairs of flip-flops of each channel having been switched to a binary ONE state (i.e., signals RSMCC5A to RSMCC5E are binary ONES). Normally, the signal RCRHD30 is a binary ONE during a read operation when a marker signal RDAM000 is a binary ONE. An AND gate 30–25 resets flip-flops 30–20 to its binary ZERO state in response to a subsequent PDA clocking signal.

When signal RDAOS10 is forced to a binary ONE, it causes a first one of the input gates of any channel incurring a "dropped bit" error to load its associated flip-flop with the binary ONE information stored in the DATA ONE flip-flop for that channel. At the same time, the second gate associated with that flip-flop is inhibited from transferring the DATA ONE contents of its associated flip-flop directly. The signal indicating that the channel has dropped a bit of information is used to inhibit the second AND gate. In the case of channel 1, this signal corresponds to signals RSDB140.

The state of the parity error signal used to generate signal RDAOS10 indicates whether the channel has dropped a binary ONE or binary ZERO bit and is used to load selectively the binary ONE from the DATA ONE flip-flop for that channel into the corresponding flip-flop of register 30. In this manner, the correction for the occurrence of a dropped bit within the channel is accomplished efficiently using a minimum amount of circuits. For that reason, the error detection apparatus of the present invention utilizes the same correction apparatus by causing the different error conditions to appear as if they were also "dropped bit error" conditions.

Once a channel is detected as "bad," the information subsequently processed by the particular channel is coded to signal that it is to be corrected by the correction circuits of FIG. 1*e*. As mentioned previously and as described in greater detail herein, the coding is accomplished by having the channel failure circuits of the channel force the corresponding pair of channel flip-flops of register 24 to their binary ONE states. The control signals generated by the channel failure indicator circuits in addition to being forwarded to the pseudo clock circuits of FIG. 1*a* are also forwarded to channel failure error circuits of FIG. 1*f*.

Channel Failure Error Circuits 43 — FIG. 1*f*

Referring to FIG. 1*f*, it is seen that the channel error circuit comprise a parity generation circuit 43–2 which receives output signals from each of the channel error indicators (i.e., signals RSCF110 through RSCF810). The parity generation circuit 43–2 also receives a signal from channel 9 error circuits which is inverted by a gate and inverter circuit 43–4. The parity generation circuit 43–2 is operative to produce a binary ZERO output signal when there have been no channel error signals generated. In the event of a channel error signal, parity generation circuit 43–2 is operative to produce a binary ONE output signal which is combined with the no multiple bit error signal ERMDR0S within an AND gate and amplifier circuit 43–6. The AND gate and amplifier circuit 43–6 forces signal ERCFE10 to a binary ONE when the error detected is a correctable error condition. That is, when only one of the channels has been determined to be potentially bad, and there have been no multiple errors detected, a signal indicating this is forwarded to error storage circuits, not shown. These storage circuits can be interrogated at the completion or termination of the read operation. Thereafter, this error signal can be used to indicate that one of the channels is operating in a degraded but not yet failed condition in that the errors are being corrected. As mentioned, this arrangement allows anticipatory diagnosis and preventive maintenance of the system prior to an actual failure which would render the information uncorrectable and hence not recoverable.

Description of Operation of the Preferred Embodiment

With reference to FIGS. 1, 1*a* through 1*f*, 2 and 3, the operation of the preferred embodiment of the present invention will now be described.

Figure 2:
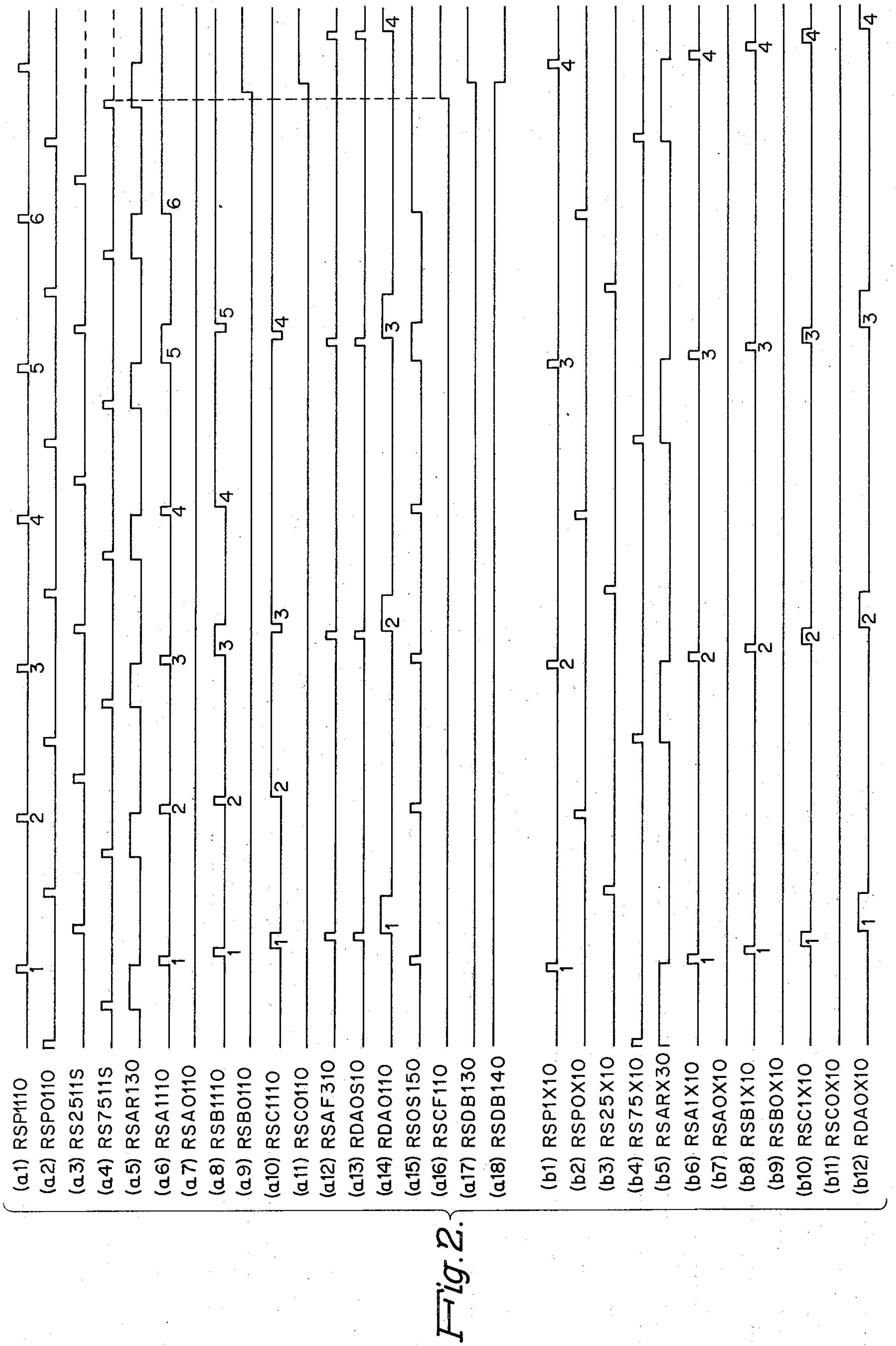
FIG. 2 shows waveforms used in explaining the operation of the apparatus of the present invention in detecting and correcting for an "overskew" condition within a channel.

Referring first to FIG. 2, there is shown the various signals generated by the circuits of FIGS. 1*a* through 1*e* when an overskew condition occurs between channel 1 and one other channel designated as "X." It is assumed in this example that channel 1 and channel X are processing a series of binary ONE bits (see waveforms *a*1, *a*2 and *b*1, *b*2). Under these circumstances, the sense amplifier circuits for channel 1 and channel "X" are operative to generate pulses of waveforms 1*a* and 1*b* designated as signals RSP1110 and RSP1X10 respectively. Additionally, the sense amplifier circuits generate at their DATA ZERO output terminals, the pulses of waveforms *a*2 and *b*2 designated as signals RSP0110 and RSPOX10 respectively. The last set of pulses constitute phase information bit which appear as negative going transitions on the recording medium.

During each bit interval, the pseudo clock circuits for channel 1 and channel "X" are operative to produce the timing pulse signals RS2511S, RS25X1S. These correspond to pairs of waveforms *a*3, *a*4 and *b*3, *b*4 of FIG. 2. Each of the pulse signals RS7511S and RS75X1S is operative to switch the corresponding amplifiers circuits (amplifier circuits 21–12 of FIG. 1*b*) to a binary ONE which forces corresponding ones of the signals RSAR130 and RSARX30 to binary ONES. Each of these signals defines the start of the bit interval during which information is read and any pulses occurring within the bit interval are operative to switch corresponding ones of the input flip-flops to their binary ONE states (e.g., channel 1 — flip-flops 22–2 and 22–12).

It is assumed that in both instances, the first bit of information being processed corresponds to the first pulse in waveforms *a*1 and *b*1. Thus, in the case of channel 1, signal RSAR130 conditions only flip-flop 22–2 to switch to its binary ONE state in response to this pulse as illustrated by waveforms *a*6 and *a*7 of FIG. 2. Similarly, the corresponding one of the flip-flops for channel "X" is switched to its binary ONE state as illustrated by waveforms *b*6 and *b*7 of FIG. 2.

In the case of channel 1, the "10" contents of flip-flops 22–2 and 22–12 are transferred or loaded into the next pair of channel 1 flip-flops 24–2 and 24–12 as illustrated by waveforms *a*8 and *a*9 of FIG. 2. A PDA clock pulse later, the "10" contents of flip-flops 24–2 and 24–12 are loaded into the last pair of channel 1 flip-flops 26–2 and 26–12 as illustrated by waveforms *a*10 and all of FIG. 2.

A similar sequence of operations takes place with respect to channel "X." That is, the "10" contents of the first pair of flip-flops are loaded into the next pair of channel "X" flip-flops as illustrated by waveforms *b*8 and *b*9. A clock pulse later, the "10" contents are loaded into the last pair of channel "X" flip-flops as illustrated by waveforms *b*10 and *b*11. Assuming that a complete character has been assembled, signal RSAF310 switches to a binary ONE which in turn switches signal RDAOS10 to a binary ONE. Thereafter, the stages of register 30 are reset to binary ZEROS prior to the next bit cell interval when the assembled character has been transferred to the utilization device. This is illustrated by waveforms *a*11 and *b*12 of FIG. 2. This causes the character assembled in register 26 to be traded into register 30 of FIG. 1*d*. As seen from FIG. 1*b*, signals RSC1H30 and RSCOH30 clears the stages of waveforms *a*10 through *a*12 and *b*10 and *b*11 of FIG. 2.

Next, the buffer section begins the processing of the second bit of information which corresponds to pulse 2 of waveforms *a*1 and *b*1 of FIG. 2. It will be noted that a similar sequence of operations takes place. However, it is seen from waveform *a*10 that flip-flop 25–2 continues to remain in its binary ONE state because all of the bits of a complete character have not yet been assembled in register 26 illustrated by waveform *a*12. That is, signal RDAOS10 has not yet been switched to a binary ONE state signaling that the A register 30 now stores all the bits of a character. What this means is that the information bits being processed by circuits of channel 1 are arriving at a much higher rate with respect to the bits being processed by the remaining channels, in particular, by channel "X." This is seen from a comparison of waveforms *a*1 and *a*2. Of course, it is assumed that channel "X" corresponds to the channel whose bits are the last to arrive and to be stored in register 26.

As mentioned, the particular channel will change during the normal processing of a data record. However, in this example, it is assumed that the pseudo clock circuits of channel 1 are operating in a marginal condition so as to exceed an established maximum of difference in arrival rates between channel 1 and one of the remaining channels, here channel X, in turn exceeding the maximum storage capacity of deskew buffer section 20.

Continuing on with the example, it will be noted that the second bit contents of the input pair of flip-flops for channel "X" are loaded into the corresponding pair of flip-flops of register 24 and then into the corresponding flip-flops of register 26. These operations are illustrated by the pairs of waveforms *b*6, *b*7 through *b*10, *b*11 of FIG. 2. When the bits of a complete character have been assembled in register 26, the flip-flop 30–22 of FIG. 1d again forces signal RSAF310 to a binary ONE. This in turn forces hold signals RSC1H30 and RSCOH30 to binary ZEROS resetting the pairs of flip-flops of register 26. The flip-flops 30–1 through 30–9 of register 30 are reset to their binary ZERO states prior to the next interval as illustrated by waveforms *a*14 and *b*12 of FIG. 2.

It will be noted from FIG. 2 that the third pulse from channel 1 sense amplifier circuits is processed in a similar manner as described above. It is seen from waveform a10 that as soon as the flip-flops 26–4 and 26–14 are cleared to binary ZEROS, the information representative of the third pulse stored in flip-flops 24–2 and 24–12 is immediately loaded into the flip-flops 26–2 and 26–12. Similarly, the third pulse sensed by the sense amplifier circuits of channel "X" are processed in the above mentioned manner.

Due to the disparity in rates between channel 1 and channel "X," the next or fourth pulse sensed by the sense amplifier circuits of channel 1 is processed and is stored in one of flip-flops 26–2 and 26–12. The fourth bit remains stored as indicated by waveform 10. This is followed by a fifth pulse being sensed by the circuits of channel 1 which is stored in one of the flip-flops 24–2 and 24–12 and remains stored as indicated by waveform *a*8. During the next bit interval, the circuits of channel 1 apply a sixth pulse which is stored in one of the flip-flops 22–2 and 22–12 as indicated by waveform a6.

Upon the beginning of a next bit interval for channel 1 established by the next RS7511S pulse signal, the channel 1 overskew detection circuits of block 41 of FIG. 1*e* are operative to switch channel failure flip-flop 41–12 of FIG. 1*e* to its binary ONE state (see waveform a16 of FIG. 2). The reason for this occurring is that one of the flip-flops of register 22 (i.e., flip-flop 22–2) is still in its binary ONE state signaling that all of the buffer registers of channel 1 are full and that there is insufficient storage for the next data bit.

As soon as signal RSCF110 switches to a binary ONE state, it causes both of the flip-flops 24–2 and 24–12 to switch to their binary ONE states (see waveforms *a*8 and *a*9). The coding of information which has taken the place of signals the overskew condition to the correction circuits of FIG. 1d as further described herein.

Additionally, the signal RSCF110 is operative to inhibit the channel 1 pseudo clock circuits 14–20 of FIG. 1*a* from generating further clocking signals. This is indicated by the dots occurring within waveforms *a*3 and *a*4 of FIG. 2. As mentioned, inhibiting the clock circuits occurs as a result of forcing hold signal RSCE11H to a binary ZERO which in turn forces enabling signal RSCE110 to a binary ZERO. Thus, channel 1 is "dead tracked" as a consequence of the overskew condition.

It will be also noted from waveforms a17 and a18 that the circuits of channel 1 are operative in response to the states of flip-flops 26–2 and 26–12 to signal the occurrence of drop bit by forcing signal RSDB130 and RSDB140 to a binary ONE and a binary ZERO respectively. Referring to FIG. 1*d*, it is seen that signal RSDB140 inhibits AND gate 30–11 from loading a binary ONE into flip-flop 30–1. Because flip-flop 26–2 for channel 1 should have been storing a binary ONE for that character, signal RDAOS10 is forced to a binary ONE by parity error signal RSVPE20 signaling that a binary ONE bit from the assembled character has been dropped by channel 1. This in turn causes the binary ONe signal stored in the channel 1 flip-flop of register 26 to be loaded into flip-flop 30–1. This action is illustrated by waveform *a*14 of FIG. 2.

It will be appreciated that if the channel 1 circuits had instead been processing a binary ZERO bit when the overskew condition within the channel had been detected, this would cause a binary zero to be loaded into flip-flop 30–1. This would result because signal RSVPE20 would be a binary ZERO in turn causing signal RDAOS10 to be a binary ZERO.

From the above, it is seen that once the overskew detection circuits of a channel have through monitoring the transfer of information through the storage devices of the channel detected an overskew condition, they are operative to switch the associated channel failure flip-flop to a binary ONE. This in turn codes the subsequently processed information within the channel so as to be detected by the dropped bit detection circuits included within the channel and corrected by other correction circuits included within the system.

Additionally, the pseudo clock circuits for the channel are inhibited, thereby "dead tracking" the channel for the remainder of record. Additionally, the channel failure flip-flop signal is applied to the circuits of FIG. 1*f*. Since it is assumed that only a single error occurred within the character assembled in register 26 and that the error is due to the above described overskew condition, the circuits of FIG. 1f are operative to force the AND gate and amplifier circuit 43–6 to a binary ONE. That is, the parity generator circuits 43–2 produce a binary ONE output signal and since there are no multiple errors, signal ERMDROS is a binary ONE. The signal ERCFE10 generated by AND gate and amplifier circuit 43–6 is forwarded to the error storage circuits for indicating that the channel is experiencing marginal operation and that the information being processed by the channel is being corrected.

Figure 3:
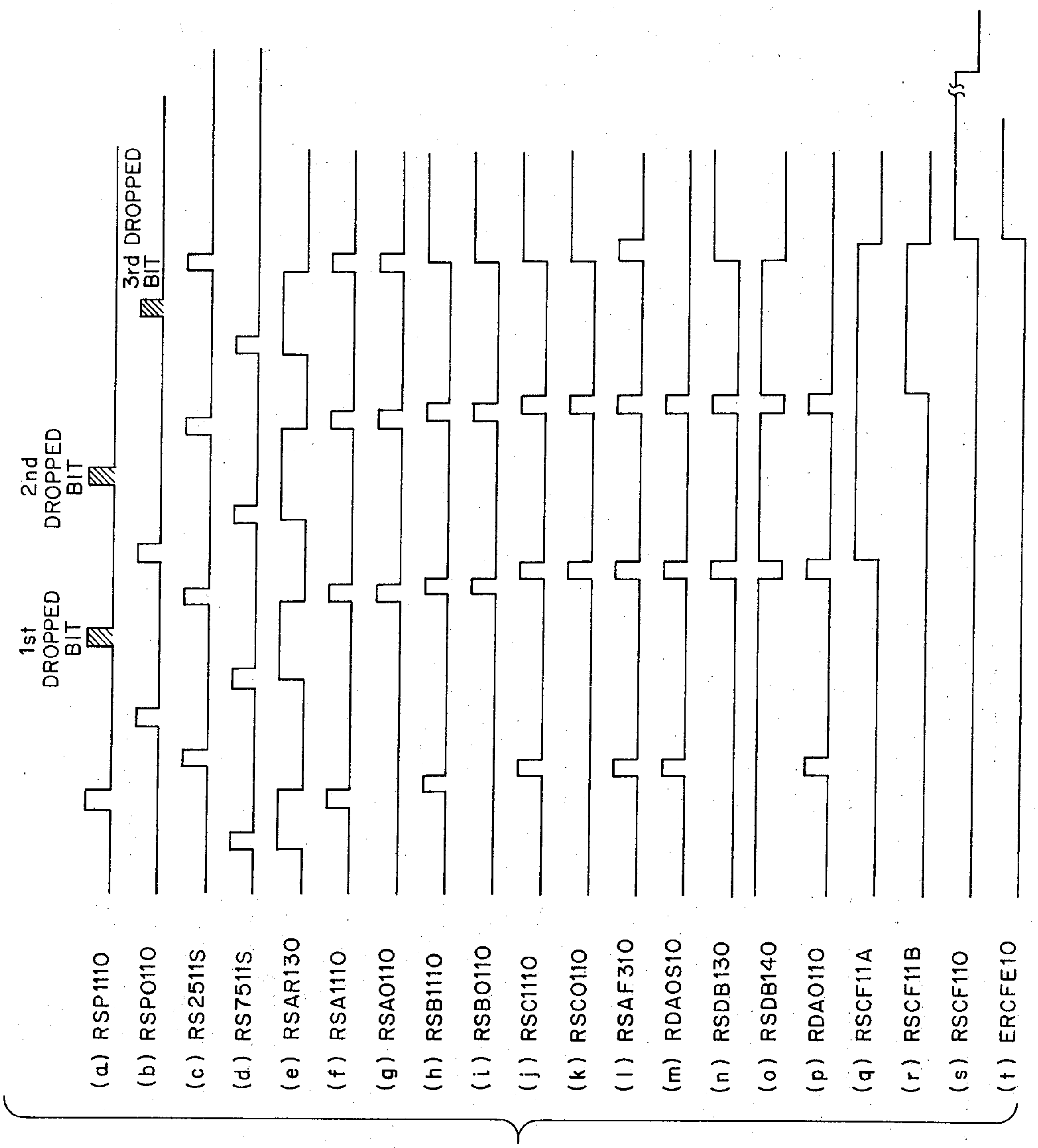
FIG. 3 shows waveforms used in explaining the operation of the apparatus of the present invention in detecting and correcting for consecutive dropped bit errors.

Additionally, the channel circuits include apparatus for detecting when a predetermined number of consecutive dropped bit errors have occurred within a channel indicating that it is operating in a marginal fashion. When this occurs, the channel failure flip-flop for that channel is again switched to a binary ONE and the information processed by that channel is coded and corrected in the same manner described above. FIG. 3 illustrates the waveforms depicting the operation of the circuits of channel 1 when the requisite number of consecutive drop bit errors have occurred.

It is assumed that the channel 1 sense amplifier circuits should be processing information coded as 1110. This is illustrated by the pulses of waveforms a and b of FIG. 3. As seen from FIG. 3, the first binary ONE bit is processed in the same manner as above. That is, it is first stored in the input pair of channel 1 flip-flops 22–2 and 22–12, then loaded into the second pair of channel 1 flip-flops 24–2 and 24–12 and then stored in the third pair of channel 1 flip-flops 26–2 and 26–12. These operations are illustrated by the pairs of waveforms *fg*, *hi* and *jk* of FIG. 3.

When all the bits of the character have been assembled in register 26, indicated by signal RSAF310 being forced to a binary ONE, the binary ONE contents of flip-flop 26–2 are then loaded into flip-flop 30–1 of register 30. This is illustrated by waveforms 1 and *p* of FIG. 3. Since it is assumed that there have been no errors detected by the dropped bit detector circuits of channel 1, the information stored in flip-flop 26–2 is loaded into flip-flop 30–1 of register 30 via AND gate 30–11. This is indicated by waveforms, m, n, o and p of FIG. 3.

Next, the sense amplifier circuits of channel 1 are operative to sense a binary ONE. However, due to assumed marginal operating conditions, this bit is "dropped" as illustrated by waveform a of FIG. 3. It will be noted that signal RSAR130 is again forced to a binary ONE in response to signal RS7511S. However, because of the absence of a pulse occurring within the bit interval defined by signals RS7511S and RS2511S, both flip-flops 22–2 and 22–12 remain their binary ZERO states. Thus, signal RSAR130 remains in a binary ONE as illustrated by waveform e of FIG. 3. Upon the occurrence of signal RS2511S, AND gates 22–25 and 22–34 are operative to switch both flip-flops 22–2 and 22–12 to their binary ONE states signaling the occurrence of dropped bit within channel 1. Waveforms f and g illustrate the foregoing.

In the manner described above, the binary ONE stored in the pair of input flip-flops of channel 1 pass through the corresponding pairs of channel 1 flip-flops of registers 24 and 26. These operations are illustrated by waveforms h through k of FIG. 3.

The parity generation circuit 32–2 of FIG. 1d is operative to force parity correction signal RSVPE20 to a binary ONE. When a complete character has been assembled at register 26, signal RSAF310 switches to a binary ONE and forces signal RDAOS10 to a binary ONE as illustrated by waveform *m* of FIG. 3. It will also be noted that the drop bit detector circuits of channel 1 force signals RSDB130 and RSDB140 to a binary ONE and a binary ZERO respectively upon sensing the binary ONE signals stored in channel 1 flip-flops 26–2 and 26–12. The foregoing is illustrated by waveforms *n* and *o* of FIG. 3. Because signal RDAOS10 is a binary ONE, it causes flip-flop 30–1 of register 30 to switch to its binary ONE state via AND gate 30–10 as illustrated by waveform *p* of FIG. 3. The correct information now resides in register 30.

Referring to FIG. 1*e*, it will be noted that the flip-flop 41–10 is switched to its binary ONE state when signals RSAF310 and RSDB130 are binary ONES. This signals an occurrence of a first "dropped bit" within channel 1 and is illustrated by waveform *u* of FIG. 3.

In a similar fashion, the circuits of channel 1 are operative to process a second dropped binary ONE bit which results in flip-flop 41–11 being switched to its binary ONE state as illustrated by waveform *r* of FIG. 3. It will be noted that flip-flop 41–11 switches to a binary ONE state as a result of an occurrence of a second consecutive dropped bit within channel 1 (i.e., signals RSCF11A and RSAF310 are both binary ONES).

It will be noted from waveforms *a* and *b* of FIG. 3 that the third dropped bit is a binary ZERO bit. The circuits of channel 1 process the bit in a fashion similar to that previously described. It will be noted that in the case of a binary ZERO bit, the parity signal RSVPE20 generated by the parity generation circuit 32–2 of FIG. 1d causes signal RDAOS10 to remain at a binary ZERO. This in turn causes flip-flop 30–1 to store a binary ZERO as illustrated by waveform *p* of FIG. 3.

More importantly, it will be noted that the occurrence of a third consecutive dropped bit within channel 1 causes channel 1 flip-flop 41–12 to be switched to its binary ONE state signaling that this channel is to be "dead tracked." Signal RSCF110 causes flip-flops 24–2 and 24–12 to be forced to their binary ONE state as illustrated by waveforms *h* and *i* of FIG. 3. From this time on, these flip-flops remain in their binary ONE states and signal the correction circuits of FIG. 1*d* to condition the channel 1 flip-flop of register 30 to store the correct information for each subsequently assembled character.

Additionally, signal RSCF110 switches error signal ERCFE10 to a binary ONE signaling the marginal operation of channel 1 and that the information in channel 1 is being corrected. Of course, it is assumed that this channel is the only channel operating marginally. That is, no multiple errors have been indicated by the circuits of FIG. 1*d*.

From the above, it is seen that when one of the detection circuits of a channel determine that a predetermined number of consecutive dropped bits have occurred within the channel, they are operative to switch the channel failure indicator circuits to a binary ONE state. As mentioned in connection with the overskew condition, the information within the channel is then coded for signaling the correction circuits of FIG. 1d that the information within that channel is to be corrected. In both instances, the same circuits used to perform corrections for transient conditions such as those which cause a bit to be "dropped" from a channel are used to correct the information within the channel once that channel has been "dead tracked." Hence the arrangement minimizes the amount of detection and correction circuits required by the system. Moreover, particularly in the case of consecutive dropped bit errors, the apparatus is able to detect more reliably the occurrence of consecutive dropped bits by coding the information within the channel as described above.

It will be appreciated that many changes may be made to the embodiment illustrated without departing from the spirit of the present invention. For example, the number of consecutive dropped bits selected which cause the circuits of a channel to signal a failure may be increased. However, this will increase the complexity of the clocking circuits and the number of deskew buffer registers within the system.

While in accordance with the provisions and statutes, there has been illustrated and described the best form of the invention known, certain changes may be made without departing from the spirit of the invention as set forth in the appended claims and that in some cases, certain features of the invention may be used to advantage without a corresponding use of other features.

Having described the invention, what is claimed is new and novel is:

1. Apparatus for detecting potential failure within any one of a plurality of information channels of a storage system, said plurality of information channels including a corresponding number of sense circuits, the sense circuit of each channel being operative to provide pulses representative of information to first and second output lines, said pulses applied to said first line representing a binary ONE and said pulses applied to said second line representing a binary ZERO, each sense circuit providing at least one pulse during each bit interval and each byte of information corresponding to a group of bit signals simultaneously recorded on the medium being read and applied to said information channels, said apparatus comprising:

- a plurality of deskewing buffer registers, each of said registers including first and second bistable storage means;
- said first and second bistable storage means of a first one of said buffer registers of each information channel being coupled to receive said pulses applied to said first and second lines respectively of a corresponding one of said sense circuits and including means for receiving first and second sets of clocking signals defining a bit interval;
- sensing means individually coupled to said first and second bistable means of said first register of said each information channel, said sensing means being operative in response to a predetermined one of said clocking signals to produce a first output signal when said first and second bistable means are in different states signaling the occurrence of an overskew condition within said information channel; and,
- bistable channel failure indicator means coupled to said sensing means of said each channel, said channel failure indicator means being conditioned by said output signal to switch from a first to a second state indicative of said potential failure within said channel associated therewith.

2. The apparatus of claim 1 further including first and second synchronous bistable storage elements coupled to receive first and second sets of asynchronous clocking signals respectively, each of said first and second bistable means including means for receiving synchronous clocking signals, said first and second bistable elements being conditioned by said synchronous clocking signals to switch from a first to a second state in response to said sets of asynchronous clocking signals to produce said clocking signals.

3. The apparatus of claim 1 further including:

- means coupled to said channel failure indicator means of said each channel and to said first and second bistable storage means of a predetermined one of said deskewing buffer registers, said means being conditioned by said indicator means when in said second state to force said first and second bistable means to a predetermined state during succeeding bit intervals signaling that the information within said failed channel requires correction.

4. The apparatus of claim 3 further including means coupled to said channel failure indicator means, said means being conditioned by said channel failure indicator means to produce a signal to inhibit the generation of said clocking signals when said channel failure indicator means switches to said second state.

5. The apparatus of claim 3 further including:

- checking means coupled to a last one of said buffer registers, said checking means being operative to perform a vertical check upon the information contents of each of said bistable means of each channel corresponding to an assembled byte of information, said checking means being operative in accordance with the results of said vertical check to generate an error correction signal signaling that the information stored in said first bistable means of said failed channel requires modification; and,
- logic gating means coupled to said first bistable means of said last one of said buffer registers of each information channel, said logic gating means of said channel signaling said failure being conditioned by said signal to transfer selectively the contents of said first bistable means to correct a corresponding one of the bit positions of said assembled byte.

6. The apparatus of claim 4 wherein said checking means includes:

- parity generation means, said parity generation means being operative to generate an odd parity check signal for said assembled byte; and,
- gating means coupled to said parity generation means, said gating means being conditioned by said check signal to force said output signal to a binary ONE and a binary ZERO respectively when the information in said failed channel is representative of a binary ONE and a binary ZERO.

7. The apparatus of claim 5 further including:

- logic gating means coupled to said first and second bistable means of said last one of said registers of each of said information channels, said gating means being operative to generate a signal when said first and second bistable means are both in a binary ONE state indicating that the information within said failed channel is to be corrected; and, multi-stage data register means coupled to receive said assembled byte signals from said last one of said buffer registers, each stage of said data register means including a pair of input gating means, one of said of pair being coupled individually to one of said first bistable means of said last one of said registers of said information channel and to said checking means, the other one of said pair being coupled to said first bistable means and to said sensing means of said information channel, said other one of said gating means being conditioned by said signal from said gating means to inhibit the transfer of the information contents of said first bistable means and said other one of said gating means being conditioned by said signal from said checking means to transfer selectively said information contents of said first bistable means.

8. The apparatus of claim 5 wherein each of said pairs of input gating means include an AND gate.

9. The apparatus of claim 1 further including:

logic sensing means individually coupled to said first and second means of said first register of said each channel, said sensing means being conditioned by said first and second bistable means when both are in the same predetermined state to generate a second output signal signaling the occurrence of a dropped pulse within said channel; and, counting means coupled to said logic sensing means and to each said channel failure indicator means, said counting means including logic means, said logic means being operative in response to said second output signal from counting a predetermined number of consecutive dropped pulses within said channel to switch said channel failure indicator means to said second state.

10. The apparatus of claim 9 further including means coupled to said channel failure indicator means, said means being conditioned by said channel failure indicator means to produce a signal to inhibit generation of said clocking signals when said channel failure indicator means switches to said second state.

11. The apparatus of claim 9 further including:

clocking means coupled to said means for separately applying said first and second sets of synchronous clocking signals to said each channel, said predetermined number of dropped pulses being selected in accordance with the operating characteristics of said clocking means.

12. The apparatus of claim 11 wherein said predetermined number corresponds to three.

13. A data recovery system for reliably processing information signals recorded within a plurality of channels as a series of transitions occurring within a corresponding number of bit intervals, at least one transition occurring within each bit interval, said system comprising:

a plurality of deskewing buffer register means for accommodating a skew of a predetermined maximum number of bit positions, each of said register means including a pair of bistable storage means, each pair of a first one of said register means being individually associated with one of said channels for receiving pulses representative of binary ONE and binary ZERO data defined by said transitions;

means for applying first and second sets of clocking signals defining the beginning and end of said bit intervals to first and second bistable storage means respectively of each pair of said first one of said register means for switching said pair from a first state to second and third states in response to pulses received during said bit intervals;

logic sensing means individually coupled to each pair of bistable storage means of a last one of said register means, said sensing means being conditioned by said each pair when in a fourth state to generate a first output signal signaling an occurrence of a dropped bit within said channel;

counting means coupled to said logic sensing means, said counting means being operative to count consecutive occurrences of said first output signal, said counting means including means being operative to produce a second output signal when said counting means advances to a predetermined count; and, bistable channel failure indicator storage means coupled to said means of said counting means and to a pair of a predetermined one of said buffer register means, said channel indicator means being operative in response to said second output signal to switch to a predetermined state signaling a potential failure within said channel, said pair being operative in response to said second output signal to switch to said fourth state during each successive bit interval.

14. The system of claim 13 further including:

means coupled to said channel failure indicator means of said each channel and to said first and second bistable storage means of a predetermined one of said deskewing buffer register means, said means being conditioned by said indicator means when in said predetermined state to force said first and second bistable means to a predetermined state during succeeding bit intervals signaling that the information within said failed channel requires correction.

15. The system of claim 14 further including means coupled to said channel failure indicator means, said means being conditioned by said channel failure indicator means to produce a signal to inhibit generation of said clocking signals when said channel failure indicator means switches to said second state.

16. The system of claim 14 further including:

checking means coupled to a last one of said buffer registers, said checking means being operative to perform a vertical check upon the information contents of each of said bistable means of each channel corresponding to as assembled byte of information, said checking means being operative in accordance with the results of said vertical check to generate an error correction signal signaling that the information stored in said first bistable means of said failed channel requires modification; and, logic gating means coupled to said first bistable means of said last one of said buffer registers of each information channel, said logic gating means of said channel signaling said failure being conditioned by said signal to transfer selectively the contents of said first bistable means to correct a corresponding one of the bit positions of said assembled byte.

17. The system of claim 16 further including:

logic gating means coupled to said first and second bistable means of said last one of said registers of each of said information channels, said gating means being operative to generate a signal when said first and second bistable means are both in a binary ONE state indicating that the information within said failed channel is to be corrected; and, multi-stage data register means coupled to receive said assembled byte signals from said last one of said buffer registers, each stage of said data register means including a pair of input gating means, one of said pair being coupled individually to one of said first bistable means of said last one of said registers of said information channel and to said checking means, the other one of said pair being coupled to said first bistable means and to said sensing means of said information channel, said other one of said gating means being conditioned by said signal from said gating means to inhibit the transfer of the information contents of said first bistable means and said other one of said gating means being conditioned by said signal from said checking means to transfer selectively said information contents of said first bistable means.

18. The system of claim 16 wherein said checking means includes:

parity generation means, said parity generation means being operative to generate an odd parity check signal for said assembled byte; and, gating means coupled to said parity generation means, said gating means being conditioned by said check signal to force said output signal to a binary ONE and a binary ZERO respectively when the information in said failed channel is representative of a binary ONE and a binary ZERO.

19. The system of claim 14 further including:

clocking means coupled to said means for separately applying said first and second sets of synchronous clocking signals to said each channel, said predetermined number of dropped pulses being selected in accordance with the operating characteristics of said clocking means.

20. The system of claim 19 wherein said predetermined number corresponds to three.

21. The system of claim 20 wherein said predetermined maximum number of bit positions corresponds to three.

22. In an information processing system, apparatus for detecting a potential failure occurring during a transfer of information through one of a plurality of information channels, each of said channels including a sense circuit operative to provide pulses representative of a bit of information to first and second output lines, each byte of information corresponding to a group of bit signals simultaneously recorded on a medium being read, and said each channel further including a predetermined maximum number of series coupled deskewing buffer registers, each of said registers including first and second bistable storage means, said first and second bistable storage means of a first one of said buffer registers of each information channel being coupled to receive said pulses applied to said first and second lines respectively and first and second sets of clocking signals defining a bit interval, said apparatus comprising:

sensing means coupled to said first and second bistable storage means of a predetermined one of said plurality of deskewing buffer registers, said sensing means being operative when said first and second bistable means are in different states to produce a first output signal in response to one of said clocking signals signaling the occurrence of an overskew condition within said channel; and, bistable channel failure indicator means coupled to said sensing means, said channel failure indicator means being conditioned by said output signal to switch from a first to a second state signaling the detection of a potential failure within said channel.

23. The system of claim 22 wherein said apparatus further includes:

means coupled to said channel failure indicator means and to said first and second bistable storage means of a predetermined one of said registers, said means being operative to force said first and second bistable storage means to a predetermined state when said channel failure indicator means is in said second state during succeeding bit intervals signaling that the information being transferred through said channel requires correction.

24. The system of claim 23 further including:

checking means coupled to each of said first bistable storage means of a last one of said buffer registers of each channel, said checking means being operative to perform a vertical check upon the contents of each of said first bistable means corresponding to an assembled byte of information, said checking means being operative in accordance with the results of said vertical check to generate a signal indicating when information being transferred through a channel requires modification; and, logic gating means coupled to said first bistable means of said last one of said buffer registers of each information channel, said logic gating means of said channel signaling said failure being conditioned by said signal to transfer selectively the contents of said first bistable means to correct a corresponding one of the bit positions to said assembled byte.

25. The system of claim 24 further including:

logic gating means coupled to said first and second bistable means of said last one of said registers of each of said information channels, said gating means being operative to generate a signal when said first and second bistable means are both in a binary ONE state indicating that the information within said failed channel is to be corrected; and, multi-stage data register means coupled to receive said assembled byte signals from said last one of said buffer registers, each stage of said data register means including a pair of input gating means, one of said pair being coupled individually to one of said first bistable means of said last one of said registers of said information channel and to said checking means, the other one of said pair being coupled to said first bistable means and to said sensing means of said information channel, said other one of said gating means being conditioned by said signal from said gating means to inhibit the transfer of the information contents of said first bistable means and said other one of said gating means being conditioned by said signal from said checking means to transfer selectively said information contents of said first bistable means.

26. The system of claim 24 wherein said checking means includes:

parity generation means, said parity generation means being operative to generate an odd parity check signal for said assembled byte; and, gating means coupled to said parity generation means, said gating means being conditioned by said check signal to force said output signal to a binary ONE and a binary ZERO respectively when the information in said failed channel is representative of a binary ONE and a binary ZERO.

27. In an information processing system, apparatus for detecting a potential failure occurring during a transfer of information through one of a plurality of information channels, each of said channels including a sense circuit operative to provide pulses representative of a bit of information to first and second output lines, each byte of information corresponding to a group of bit signals simultaneously recorded on a medium being read, and said each channel further including a predetermined maximum number of series coupled deskewing buffer registers, each of said registers including first and second bistable storage means, said first and second bistable storage means of a first one of said buffer registers of each information channel being coupled to receive said pulses applied to said first and second lines respectively and first and second sets of clocking signals defining a bit interval, said apparatus comprising:

logic sensing means individually coupled to said first and second means of said first register of said each channel, said sensing means being conditioned by said first and second bistable means when both are in the same predetermined state to generate a second output signal signaling the occurrence of a dropped pulse within said channel; and, counting means coupled to said logic sensing means and to each said channel failure indicator means, said counting means including logic means, said logic means being operative in response to said second output signal from counting a predetermined number of consecutive dropped pulses within said channel to switch said channel failure indicator means to said second state.

28. The system of claim 27 wherein said predetermined number corresponds to three.

29. The system of claim 27 wherein said apparatus further includes:

means coupled to said channel failure indicator means of said each channel and to said first and second bistable storage means of a predetermined one of said deskewing buffer register means, said means being conditioned by said indicator means when in said predetermined state to force said first and second bistable means to a predetermined state during succeeding bit intervals signaling that the information within said failed channel requires correction.

30. The system of claim 27 wherein said apparatus further includes:

means coupled to said channel failure indicator means, said means being conditioned by said channel failure indicator means to produce a signal to inhibit generation of said clocking signals when said channel failure indicator means switches to said second state.

* * * * *

UNITED STATES PATENT OFFICE
CERTIFICATE OF CORRECTION

Patent No. 3,803,552 Dated April 9, 1974

Inventor(s) George J. Barlow and John A. Klashka

It is certified that error appears in the above-identified patent and that said Letters Patent are hereby corrected as shown below:

In the abstract, second column, line 10, delete "the" and insert --both--.

Column 19, line 34, delete "from" and insert --upon--.

Column 20, line 53, delete "as" and insert --an--.

Column 24, line 6, delete "said".

Column 24, line 9, delete "from" and insert --upon--.

Column 24, line 12, delete "said" and insert --a--.

Column 24, line 25, delete "said" and insert --the--.

Column 24, line 34, delete "second" and insert --predetermined--.

Signed and sealed this 17th day of December 1974.

(SEAL)
Attest:

McCOY M. GIBSON JR.
Attesting Officer

C. MARSHALL DANN
Commissioner of Patents